United States Patent
Jones et al.

(10) Patent No.: US 10,836,505 B2
(45) Date of Patent: Nov. 17, 2020

(54) OPERATING AUXILIARY POWER UNIT DURING OFF-NOMINAL PROPULSION SYSTEM OPERATION

(71) Applicant: United Technologies Corporation, Farmington, CT (US)

(72) Inventors: Anthony C. Jones, San Diego, CA (US); Behzad Hagshenas, San Diego, CA (US)

(73) Assignee: Raytheon Technologies Corporation, Farmington, CT (US)

(*) Notice: Subject to any disclaimer, the term of this patent is extended or adjusted under 35 U.S.C. 154(b) by 1092 days.

(21) Appl. No.: 15/190,931

(22) Filed: Jun. 23, 2016

(65) Prior Publication Data
US 2017/0369180 A1    Dec. 28, 2017

(51) Int. Cl.
| | |
|---|---|
| *B64D 41/00* | (2006.01) |
| *F02C 6/00* | (2006.01) |
| *F02C 9/42* | (2006.01) |
| *B64C 13/38* | (2006.01) |
| *F01D 15/08* | (2006.01) |
| *F01D 15/10* | (2006.01) |
| *F02C 7/262* | (2006.01) |
| *F02C 7/277* | (2006.01) |

(52) U.S. Cl.
CPC .............. *B64D 41/00* (2013.01); *B64C 13/38* (2013.01); *F01D 15/08* (2013.01); *F01D 15/10* (2013.01); *F02C 6/00* (2013.01); *F02C 7/262* (2013.01); *F02C 7/277* (2013.01); *F02C 9/42* (2013.01); *B64D 2221/00* (2013.01); *F05D 2220/323* (2013.01); *F05D 2220/50* (2013.01); *Y02T 50/44* (2013.01)

(58) Field of Classification Search
CPC ...... B64D 41/00; B64D 2221/00; B64C 13/42
See application file for complete search history.

(56) References Cited

U.S. PATENT DOCUMENTS

| | | | |
|---|---|---|---|
| 3,834,161 A | 9/1974 | Quigley, Jr. et al. | |
| 4,684,081 A | 8/1987 | Cronin | |
| 5,274,992 A | 1/1994 | Klaass et al. | |
| 6,247,668 B1 | 6/2001 | Reysa et al. | |
| 6,868,664 B2 | 3/2005 | Albero et al. | |
| 6,931,832 B2 | 8/2005 | Berg et al. | |
| 6,968,701 B2 | 11/2005 | Glahn et al. | |
| 7,322,197 B2 | 1/2008 | Kudrna et al. | |
| 8,019,522 B2 | 9/2011 | Coons | |
| 8,800,918 B2 | 8/2014 | Morris et al. | |
| 9,248,907 B2 * | 2/2016 | Smiley | B64C 27/12 |

(Continued)

OTHER PUBLICATIONS

EP search report for EP17177528.1 dated Nov. 22, 2017.

*Primary Examiner* — Brian M O'Hara
(74) *Attorney, Agent, or Firm* — Getz Balich LLC

(57) ABSTRACT

An aircraft system includes a component configured to operate with a minimum power demand. The aircraft system also includes an auxiliary power unit including an engine. The auxiliary power unit is configured to power the component and to operate the engine in a plurality of operating modes including a power mode and a standby mode. The auxiliary power unit generates a first power output at least equal to the minimum power demand during the power mode. The auxiliary power unit generates a second power output less than the minimum power demand during the standby mode.

19 Claims, 3 Drawing Sheets

(56) References Cited

U.S. PATENT DOCUMENTS

| | | | |
|---|---|---|---|
| 9,328,661 B2* | 5/2016 | Ho | F02C 7/00 |
| 10,173,784 B2* | 1/2019 | Stewart | F02C 7/042 |
| 2008/0179947 A1* | 7/2008 | Suttie | F02C 9/00 |
| | | | 307/9.1 |
| 2014/0182306 A1 | 7/2014 | Castagnera | |
| 2014/0373554 A1 | 12/2014 | Pech et al. | |
| 2016/0039371 A1 | 2/2016 | Blumer et al. | |
| 2016/0362999 A1* | 12/2016 | Ho | B64D 41/00 |
| 2017/0152055 A1* | 6/2017 | Mercier-Calvairac | |
| | | | B64D 35/08 |

* cited by examiner

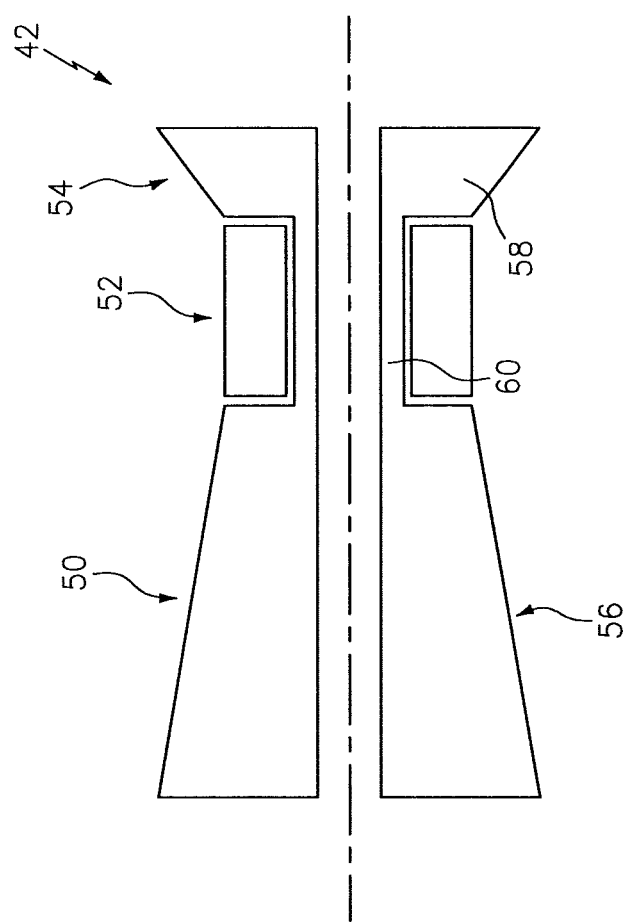

OPERATING AUXILIARY POWER UNIT DURING OFF-NOMINAL PROPULSION SYSTEM OPERATION

BACKGROUND OF THE INVENTION

1. Technical Field

This disclosure relates generally to an aircraft system and, more particularly, to providing backup power during off-nominal operation of an aircraft propulsion system.

2. Background Information

A single engine aircraft system may include an auxiliary power unit (APU) turbine engine, a single propulsion system turbine engine and an emergency power source. The APU turbine engine is typically used before and during startup of the propulsion system turbine engine. However, once the propulsion system turbine engine is started and running, the APU turbine engine is typically turned off. Once powered up, the propulsion system turbine engine is used to provide the aircraft with thrust. The propulsion system turbine engine is also used to power certain other components of the aircraft. However, during off-nominal operation of the propulsion system turbine engine (e.g., during engine flameout), the propulsion system turbine engine is incapable of powering those other aircraft components, the operation of which may be needed for safe, stable and/or controllable aircraft flight. The emergency power source therefore is activated to provide temporary power to the components until, for example, nominal operation of the propulsion system turbine engine can be restored.

Various emergency power source types and configurations are known in the art. Examples of such emergency power sources include a reservoir containing high pressure air or a thermal battery. While known emergency power sources have various advantageous, they add complexity, weight and cost to the aircraft. There is a need in the art therefore for an improved backup power source with reduced complexity, weight and/or cost.

SUMMARY OF THE DISCLOSURE

According to an aspect of the present disclosure, an aircraft system is provided that includes a component configured to operate with a minimum power demand. The aircraft system also includes an auxiliary power unit including an engine. The auxiliary power unit is configured to power the component. The auxiliary power unit is also configured to operate the engine in a plurality of operating modes, which include a power mode and a standby mode. The auxiliary power unit generates a first power output at least equal to the minimum power demand during the power mode. The auxiliary power unit generates a second power output less than the minimum power demand during the standby mode.

According to another aspect of the present disclosure, another aircraft system is provided that includes a component and an auxiliary power unit. The auxiliary power unit includes an engine that includes a rotating assembly. The auxiliary power unit is configured to power the component. The auxiliary power unit is also configured to operate the engine in a plurality of operating modes, which include a first mode and a second mode. The auxiliary power unit is configured to rotate the rotating assembly at about a first rotational speed during the first mode. The auxiliary power unit is configured to continuously rotate the rotating assembly at about a second rotational speed during the second mode that is less than about eighty-five percent of the first rotational speed.

According to still another aspect of the present disclosure, another aircraft system is provided that includes a component and an auxiliary power unit, which includes an engine. The auxiliary power unit is configured to power the component and to operate the engine in a plurality of operating modes, which include a first mode and a second mode. The auxiliary power unit is configured to generate a first power output during the first mode. The auxiliary power unit is also configured to generate a second power output during the second mode. The second power output is less than about fifty percent of the first power output.

The component may be configured to operate with a minimum power demand. The first power output may be at least equal to the minimum power demand. The second power output may be less than the minimum power demand.

The engine may include a rotating assembly. The auxiliary power unit may be configured to rotate the rotating assembly at about a first rotational speed during the power mode. The auxiliary power unit may be configured to rotate the rotating assembly at about a second rotational speed during the standby mode that is less than about eighty-five percent of the first rotational speed.

The second rotational speed may be between about fifty percent and about eighty percent of the first rotational speed.

The aircraft system may include a flight control system, which includes the component.

The component may be or otherwise include an actuator.

The component may be or otherwise include a piece of avionics.

The aircraft system may include an electric generator. The engine may be configured to drive the electric generator to electrically power the component.

The aircraft system may include a hydraulic pump. The engine may be configured to drive the hydraulic pump to hydraulically power the component.

The aircraft system may include an aircraft propulsion system, which includes a gas turbine engine. The auxiliary power unit may be configured to power the aircraft propulsion system during startup of the gas turbine engine.

The aircraft system may include an aircraft propulsion system, which includes a gas turbine engine. The auxiliary power unit may be configured to operate the engine in the standby mode during nominal operation of the gas turbine engine. The auxiliary power unit may be configured to operate the engine in the power mode during off-nominal operation of the gas turbine engine.

The off-nominal operation may occur during a flameout of the gas turbine engine.

The auxiliary power unit may be configured to transition from the standby mode to the power mode within a time period equal to or less than approximately five seconds.

The auxiliary power unit may be configured to transition from the standby mode to the power mode within a time period equal to or less than approximately three seconds.

The second rotational speed may be between about fifty percent and about eighty percent of the first rotational speed.

The component may be configured to operate with a minimum power demand. The auxiliary power unit may be configured to generate a first power output at least equal to the minimum power demand during the power mode. The auxiliary power unit may also be configured to generate a second power output less than the minimum power demand during the standby mode.

The component may be configured to operate with a minimum power demand. The auxiliary power unit may be configured to generate a first power output at least equal to the minimum power demand during the first mode, and to generate a second power output less than the minimum power demand during the second mode.

The aircraft system may include an aircraft propulsion system, which includes a gas turbine engine. The auxiliary power unit may be configured to operate the engine in the second mode during nominal operation of the gas turbine engine. The auxiliary power unit may be configured to operate the engine in the first mode during off-nominal operation of the gas turbine engine.

The engine may be configured as or otherwise include a gas turbine engine.

The foregoing features and the operation of the invention will become more apparent in light of the following description and the accompanying drawings.

BRIEF DESCRIPTION OF THE DRAWINGS

FIG. 3 is a schematic illustration of a gas turbine engine included in the auxiliary power unit.

DETAILED DESCRIPTION OF THE INVENTION

Figure 1:
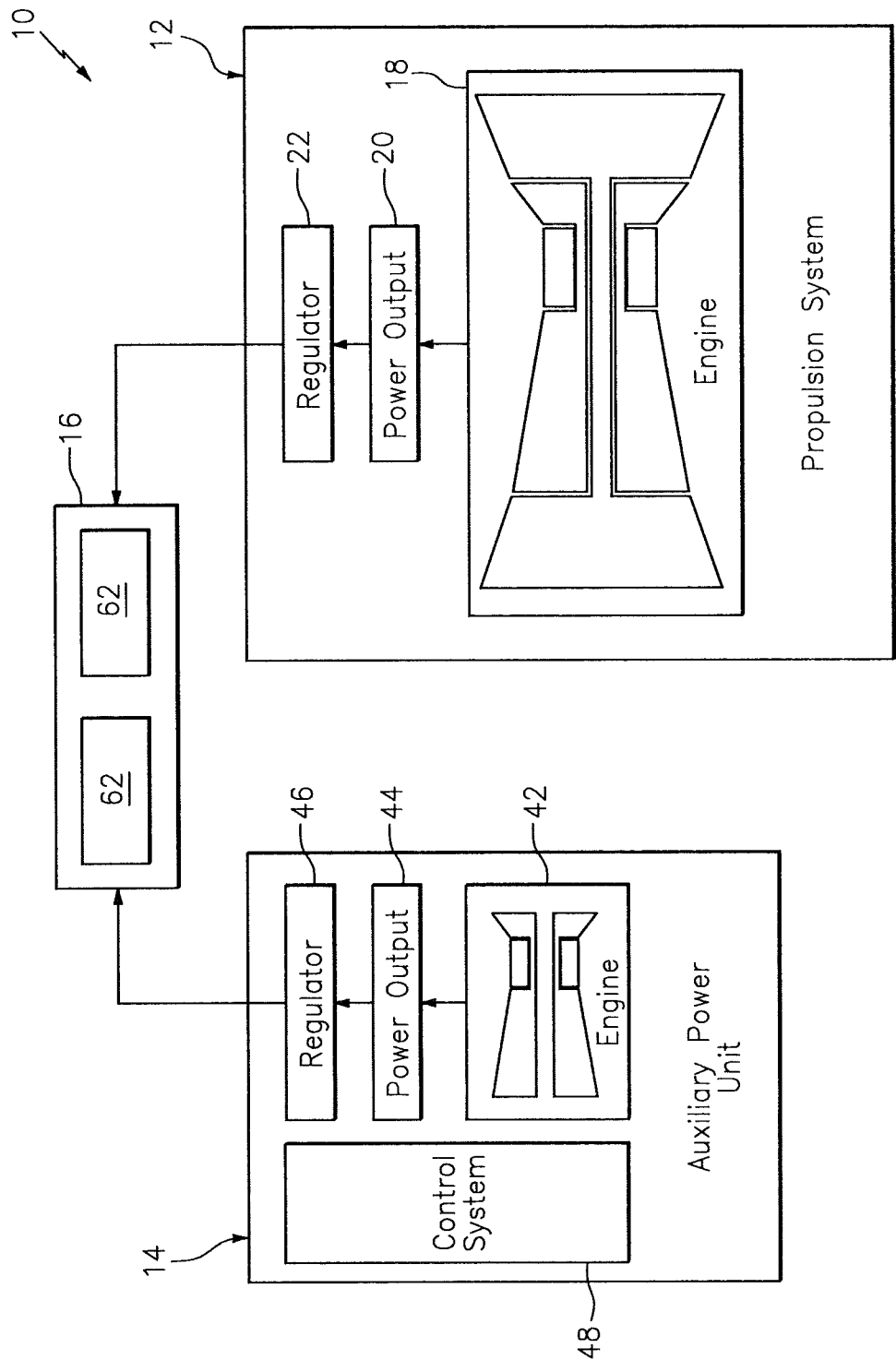
FIG. 1 is a schematic illustration of a system for an aircraft which includes an aircraft propulsion system and an auxiliary power unit.

FIG. 1 is a schematic illustration of a system 10 for an aircraft such as, but not limited to, a single engine airplane. This aircraft system 10 includes an aircraft propulsion system 12, an auxiliary power unit (APU) 14 and a power demand 16.

The aircraft propulsion system 12 may have a single engine configuration. The aircraft propulsion system 12 of FIG. 1, for example, includes a single gas turbine engine 18. However, in other embodiment, the aircraft propulsion system 12 may include two or more gas turbine engines. Referring again to FIG. 1, the aircraft propulsion system 12 also includes at least one power output device 20 and at least one power regulator 22.

Figure 2:
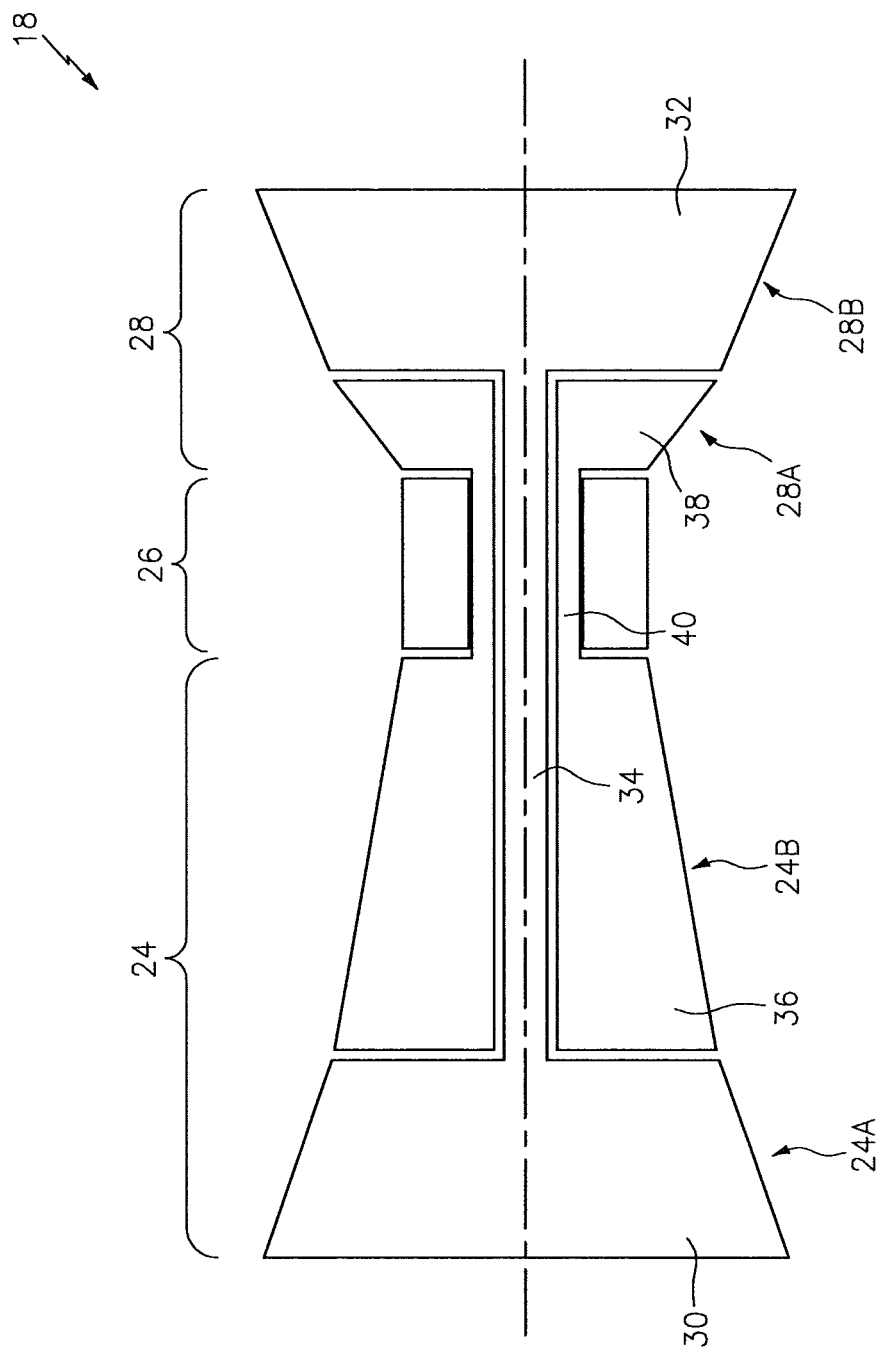
FIG. 2 is a schematic illustration of a gas turbine engine included in the aircraft propulsion system.

The gas turbine engine 18 may be configured as a turbojet engine, or any other type of gas turbine engine. Examples of other types of suitable gas turbine engine configurations include a turbofan engine, a propfan engine and a pusher fan engine. Referring to FIG. 2, the gas turbine engine 18 includes a compressor section 24, a combustor section 26 and a turbine section 28. The compressor section 24 includes a low pressure compressor (LPC) section 24A and a high pressure compressor (HPC) section 24B. The turbine section 28 includes a high pressure turbine (HPT) section 28A and a low pressure turbine (LPT) section 28B. Rotors 30 and 32 in the sections 24A and 28B are coupled together by a low speed shaft 34 to provide a low speed rotating assembly; e.g., a low speed spool. Rotors 36 and 38 in the sections 24B and 28A are coupled together by a high speed shaft 40 to provide a high speed rotating assembly; e.g., a high speed spool. Each of these rotors 30, 32, 36 and 38 includes a plurality of rotor blades arranged circumferentially around and connected to one or more respective rotor disks. While this gas turbine engine 18 is described above having a two spool configuration, the gas turbine engine 18 may alternatively have a single spool configuration or a three or more spool configuration. Furthermore, in some embodiments, the gas turbine engine 18 may also include a gear train to mechanically couple two rotors together; e.g., a fan section rotor to a LPT section rotor. The present disclosure, of course, is not limited to the foregoing exemplary gas turbine engine types of configurations.

Referring to FIG. 1, the power output device 20 is mechanically coupled to a component (e.g., the shaft 34, 40; see FIG. 2) of one of the rotating assemblies through, for example, an accessory gearbox and a coupling assembly (e.g., a tower shaft assembly). The power output device 20 is configured to convert mechanical power received from the gas turbine engine 18 to electrical power or hydraulic power. The power output device 20, for example, may be configured as or otherwise include an electric generator. In another example, the power output device 20 may be configured as or otherwise include a hydraulic pump. The present disclosure, of course, is not limited to the foregoing exemplary power output device types or configurations.

The power regulator 22 is connected serially inline between the power output device 20 and the power demand 16. This power regulator 22 is configured to selectively direct and/or regulate a power output to the power demand 16. The power regulator 22, for example, may be configured as an electrical regulator (e.g., a switch) where the power output device 20 is an electric generator. In another example, the power regulator 22 may be configured as a hydraulic valve or bypass where the power output device 20 is an electric generator. The present disclosure, of course, is not limited to the foregoing exemplary power regulator types or configurations.

The auxiliary power unit 14 includes a gas turbine engine 42, at least one power output device 44 and at least one power regulator 46. The auxiliary power unit 14 also includes or is otherwise configured with a control system 48 in signal communication (e.g., hardwired and/or wirelessly connected) with one or more other components of the auxiliary power unit 14; e.g., the components 42 and 46.

Referring to FIG. 3, the gas turbine engine 42 may be configured as a single spool/shaft gas turbine engine; however, the present disclosure is not limited thereto. The gas turbine engine 42 of FIG. 3, for example, includes a compressor section 50, a combustor section 52 and a turbine section 54. Rotors 56 and 58 in the sections 50 and 54 are coupled together by a shaft 60 to provide a rotating assembly; e.g., a spool. Each of these rotors 56 and 58 includes a plurality of rotor blades arranged circumferentially around and connected to one or more respective rotor disks. While this gas turbine engine 42 is described above having a single spool configuration, the gas turbine engine 42 may alternatively have a two or more spool configuration. The present disclosure, of course, is not limited to the foregoing exemplary gas turbine engine type of configurations.

Referring to FIG. 1, the power output device 44 is mechanically coupled to a component (e.g., the shaft 60; see FIG. 3) of the rotating assembly through, for example, an accessory gearbox and a coupling assembly (e.g., a tower shaft assembly or drive shaft assembly). The power output device 44 is configured to convert mechanical power received from the gas turbine engine 42 to electrical power or hydraulic power. The power output device 44, for example, may be configured as or otherwise include an electric generator. In another example, the power output device 44 may be configured as or otherwise include a hydraulic pump. The present disclosure, of course, is not limited to the foregoing exemplary power output device types or configurations.

The power regulator 46 is connected serially inline between the power output device 44 and the power demand 16. This power regulator 46 is configured to selectively direct and/or regulate a power output to the power demand 16. The power regulator 46, for example, may be configured as an electrical regulator (e.g., a switch) where the power output device 44 is an electric generator. In another example, the power regulator 46 may be configured as a hydraulic valve or bypass where the power output device 44 is an electric generator. The present disclosure, of course, is not limited to the foregoing exemplary power regulator types or configurations.

The control system 48 is configured to control operation of one or more other components of the aircraft system 10; e.g., the components 42 and 46. The control system 48 may be implemented as a single controller. Alternative, the control system 48 may be implemented using a plurality of interconnected or discrete (e.g., sub-system) controllers. Each controller may be implemented with a combination of hardware and software. The hardware may include memory and at least one processing device, which may include one or more single-core and/or multi-core processors. The hardware may also or alternatively include analog and/or digital circuitry other than that described above.

The memory is configured to store software (e.g., program instructions) for execution by the processing device, which software execution may control and/or facilitate performance of one or more operations such as those described below. The memory may be a non-transitory computer readable medium. For example, the memory may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

The power demand 16 includes one or more components 62 of the aircraft which require hydraulic or electrical power during aircraft operation; e.g., taxiing, takeoff, landing, cruise, etc. Examples of such components include, but are not limited to: a component (e.g., actuator) of a flight control system such as, but not limited to, a flap, aileron, slat, rudder, spoiler and/or elevator system; an actuator for another aircraft system; a piece of avionics (e.g., a flight control computer); a generator; and a component of an environmental control system. The power demand 16 and, more particularly, at least one or each of its components 62 is configured to operate with a minimum power demand. The terminology "minimum power demand" may describe a minimum (lowest) quantity of power which the power demand 16 (e.g., its component(s) 62) need to operate as specified. For example, if a power demand component receives less than its minimum power demand, that component may not operate at a specified level, the component may be substantially inoperable, or resistance imparted by the component onto its power source (e.g., the gas turbine engine 42) may cause that power source to stall or otherwise.

During nominal operation of the aircraft propulsion system 12 and its gas turbine engine 18, the power demand components 62 receive their power from (i.e., the power output of) the aircraft propulsion system 12. However, under certain circumstances, the aircraft propulsion system 12 may be incapable of meeting the minimum power demand of the power demand components 62. Such circumstances may occur during off-nominal operation of the gas turbine engine 18 such as, but not limited to, during a stall or flameout condition. As generally known in the art, restarting a typical propulsion system gas turbine engine at a high altitude may be difficult and/or may take a relatively long period of time. For example, if a flame out occurs at an altitude of about 40,000 feet, the aircraft may need to descend in a controlled fashion to an altitude of about 25,000 feet or lower where gas turbine engine startup may take about 60 or more seconds. Of course, the present disclosure is not limited to the foregoing example.

The ability to substantially continuously use one or more of the power demand components 62 may be required for stable/controlled/safe flight of the aircraft. Therefore, in order to bridge a power gap resulting from the off-nominal operation of the gas turbine engine 18, the auxiliary power unit 14 is configured to operate its gas turbine engine 42 in a plurality of different operating modes. These operating modes include a power mode and a standby mode, where the power mode may be selected during off-nominal operation of the gas turbine engine 18 and the standby mode may be selected during nominal operation of the gas turbine engine.

During the power mode, the auxiliary power unit 14 operates its gas turbine engine 42 at a power mode setting; e.g., idle. At this power mode setting, the gas turbine engine 42 is operable to generate a non-zero, first power output through the power output device 44, which is directed to one or more of the power demand components 62 via the power regulator 46. The first power output is at least equal to or greater than the minimum power demand of the respective component(s) 62. In this manner, the auxiliary power unit 14 may operate in the power mode during off-nominal operation of the gas turbine engine 18 in order to at least partially or substantially completely bridge the power gap between the nominal operation of the aircraft propulsion system 12.

During the standby mode, the auxiliary power unit 14 operates its gas turbine engine 42 at a standby mode setting; e.g., sub-idle. At this standby mode setting, the gas turbine engine 42 is operable to generate a non-zero, second power output through the power output device 44. More particularly, the gas turbine engine 42 may be (e.g., continuously) operated such that a (sub-idle) rotational speed of the rotating assembly during the standby mode is less than about eighty-five percent (e.g., between about fifty percent and about seventy or eighty percent) of a (idle) rotational speed of the rotating assembly during the power mode; of course, the rotational speeds may fluctuate slightly due to environmental conditions, etc. Thus, the second power output is less than (e.g., at least about fifty or thirty percent) first power output and is less than the minimum power demand of the respective component(s) 62. However, the power demand components are powered by the aircraft propulsion system 12 during this standby mode and, thus, a large power output from the auxiliary power unit 14 is not needed. Furthermore, by reducing the power output of the auxiliary power unit 14 and the rotational speed of the rotating assembly, fuel consumption of the auxiliary power unit 14 during nominal operation of the gas turbine engine 18 may be significantly reduced.

In some embodiments, the power regulator 46 may direct the second power output to the respective component(s) 62. For example, the power output of the auxiliary power unit 14 may be combined with the power output of the aircraft propulsion system 12 to collectively power the power demand components 62. Alternatively, the power regulator 46 may not direct the second power output to the respective component(s) 62. Rather, the second power output may become waste power, used for other components, or stored for later use; e.g., via a battery, accumulator, etc.

In some embodiments, the auxiliary power unit 14 may be configured to transition from the standby mode to the power mode within a time period equal to or less than approximately five seconds; e.g., equal to or less than approximately three seconds.

In some embodiments, the rotational speed of the rotating assembly of the auxiliary power unit 14 during the standby mode may be substantially fixed; of course, the rotational speed may fluctuate slightly due to environmental conditions, etc. In other embodiments, the rotational speed of the rotating assembly during the standby mode may be continuously, periodically, or otherwise varied. By varying the standby mode rotational speed based on aircraft altitude, ambient temperature and/or one or more other parameters, the fuel efficiency of the auxiliary power unit 14 may be optimized during the standby (e.g., sub-idle) mode.

In some embodiments, the rotating assembly of the auxiliary power unit 14 may be continuously rotated below a certain rotational speed during the standby mode. For example, the rotating assembly may be rotated at a certain rotational speed, or within a certain rotational speed range, for a relatively long period of time; e.g., more than 2, 3, 4, 5 or more minutes.

In some embodiments, the aircraft propulsion system 12 may include two or more gas turbine engines as described above. In such embodiments, the auxiliary power unit 14 may be configured to provide backup power (e.g., operate in the power mode) when one of the gas turbine engines flames out or otherwise is incapable of powering the component(s) 62 (e.g., loses operability of an accessory generator, pump, etc.). In this manner, the auxiliary power unit 14 may account for the power loss and eliminate (or at least reduce) the need to increase power output from the remaining nominally operating gas turbine engine(s).

The engine 42 is described above as a gas turbine engine for ease of description. However, in other embodiments, the engine 42 may alternatively be configured as another type of engine; e.g., a rotary engine, an internal combustion engine, etc. The auxiliary power unit 14 therefore is not limited to including any particular engine 42 type or configuration.

The operation of the auxiliary power unit 14 is described with references to certain exemplary percentages and times. The present disclosure, however, is not limited to the examples provided above. For example, the transition time may be more than five seconds. In another example, the power output of the auxiliary power unit 14 during the standby mode may be more than fifty percent of the power output of the auxiliary power unit 14 during nominal operation. In still another example, the (sub-idle) rotational speed of the rotating assembly during the standby mode may be less than about fifty percent the (idle) rotational speed of the rotating assembly during the power mode.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An aircraft system, comprising:
an aircraft propulsion system comprising a gas turbine engine;
a component configured to operate with a minimum power demand; and
an auxiliary power unit comprising an auxiliary power unit engine;
the auxiliary power unit configured to power the component, and the auxiliary power unit configured to operate the auxiliary power unit engine in a plurality of operating modes during aircraft flight, the plurality of operating modes including a power mode and a standby mode;
wherein the auxiliary power unit generates a first power output at least equal to the minimum power demand during the power mode during off-nominal operation of the gas turbine engine, and generates a non-zero, second power output less than the minimum power demand during the standby mode during nominal operation of the gas turbine engine; and
wherein the off-nominal operation occurs during a stall of the gas turbine engine.

2. The aircraft system of claim 1, wherein
the auxiliary power unit engine includes a rotating assembly;
the auxiliary power unit is configured to rotate the rotating assembly at a first rotational speed during the power mode; and
the auxiliary power unit is configured to rotate the rotating assembly at a second rotational speed during the standby mode that is less than eighty-five percent of the first rotational speed.

3. The aircraft system of claim 2, wherein the second rotational speed is between fifty percent and eighty percent of the first rotational speed.

4. The aircraft system of claim 1, further comprising a flight control system including the component.

5. The aircraft system of claim 1, wherein the component comprises an actuator.

6. The aircraft system of claim 1, wherein the component comprises a piece of avionics.

7. The aircraft system of claim 1, further comprising:
an electric generator;
wherein the auxiliary power unit engine is configured to drive the electric generator to electrically power the component.

8. The aircraft system of claim 1, further comprising:
a hydraulic pump;
wherein the auxiliary power unit engine is configured to drive the hydraulic pump to hydraulically power the component.

9. The aircraft system of claim 1, wherein the auxiliary power unit engine comprises a gas turbine engine.

10. The aircraft system of claim 1, wherein the auxiliary power unit is configured to power the aircraft propulsion system during startup of the gas turbine engine.

11. The aircraft system of claim 1, wherein the off-nominal operation occurs during a flameout of the gas turbine engine.

12. The aircraft system of claim 1, wherein the auxiliary power unit is configured to transition from the standby mode to the power mode within a time period equal to or less than approximately five seconds.

13. The aircraft system of claim 1, wherein the auxiliary power unit is configured to transition from the standby mode to the power mode within a time period equal to or less than approximately three seconds.

14. An aircraft system, comprising:
an aircraft propulsion system comprising a gas turbine engine;
a component; and
an auxiliary power unit comprising an auxiliary power unit engine that includes a rotating assembly;
the auxiliary power unit configured to power the component and to operate the auxiliary power unit engine in a plurality of operating modes during aircraft flight, the plurality of operating modes including a first mode and a second mode;
wherein the auxiliary power unit is configured to rotate the rotating assembly at a first rotational speed during the first mode;
wherein the auxiliary power unit is configured to continuously rotate the rotating assembly at a second rotational speed during the second mode that is less than eighty-five percent of the first rotational speed; and
wherein the first mode occurs during a stall of the gas turbine engine.

15. The aircraft system of claim 14, wherein the second rotational speed is between fifty percent and eighty percent of the first rotational speed.

16. The aircraft system of claim 14, wherein
the component is configured to operate with a minimum power demand; and
the auxiliary power unit is configured to generate a first power output at least equal to the minimum power demand during the first mode, and to generate a second power output less than the minimum power demand during the second mode.

17. The aircraft system of claim 14, wherein the auxiliary power unit is configured to power the gas turbine engine during startup of the gas turbine engine.

18. The aircraft system of claim 14, wherein:
the auxiliary power unit is configured to operate the auxiliary power unit engine in the second mode during nominal operation of the gas turbine engine; and
the auxiliary power unit is configured to operate the auxiliary power unit engine in the first mode during off-nominal operation of the gas turbine engine.

19. An aircraft system, comprising:
an aircraft propulsion system comprising a gas turbine engine;
a component; and
an auxiliary power unit comprising an auxiliary power unit engine;
the auxiliary power unit configured to power the component and to operate the auxiliary power unit engine in a plurality of operating modes during aircraft flight, the plurality of operating modes including a first mode and a second mode;
wherein the auxiliary power unit is configured to generate a first power output during the first mode, and to generate a second power output during the second mode;
wherein the second power output is less than fifty percent of the first power output; and
wherein the first mode occurs during a stall of the gas turbine engine.

* * * * *